United States Patent [19]

Kant et al.

[11] Patent Number: 4,763,097
[45] Date of Patent: Aug. 9, 1988

[54] MEASUREMENT TRANSFORMER

[75] Inventors: Bernhard Kant, Eschborn; Wolfgang Porth, Frankfurt am Main, both of Fed. Rep. of Germany

[73] Assignee: VDO Adolf Schindling AG, Frankfurt am Main, Fed. Rep. of Germany

[21] Appl. No.: 831,074

[22] Filed: Feb. 18, 1986

Related U.S. Application Data

[63] Continuation of Ser. No. 630,930, Jul. 16, 1984.

[30] Foreign Application Priority Data

Jul. 15, 1983 [DE] Fed. Rep. of Germany ....... 3325539

[51] Int. Cl.$^4$ .............................................. G01L 1/22
[52] U.S. Cl. ............................................ 338/4; 338/2; 338/5; 73/862.65
[58] Field of Search .................... 338/2, 4, 5, 42; 73/726, 720, 862.65

[56] References Cited

U.S. PATENT DOCUMENTS

| | | | |
|---|---|---|---|
| Re. 25,924 | 12/1965 | Stedman | 338/2 |
| 3,022,672 | 2/1962 | Dimeff et al. | 73/726 |
| 3,138,027 | 6/1964 | Li | 73/726 |
| 3,204,463 | 9/1965 | Taber | 73/726 |
| 3,520,191 | 7/1970 | Pien | 73/726 |
| 3,869,906 | 3/1975 | Andersson | 73/726 X |
| 4,017,819 | 4/1977 | Pien | 73/862.65 X |

OTHER PUBLICATIONS

Tashkinov et al., "Sylphan Strain Gauge Resistor Pressure Transducer", Izmeritel'naya Tekhnika, No. 12, pp. 42–43, Dec. 1979.

*Primary Examiner*—E. A. Goldberg
*Assistant Examiner*—Marvin M. Lateef
*Attorney, Agent, or Firm*—Martin A. Farber

[57] ABSTRACT

A measurement transformer has a pressure chamber which is sealed off by a membrane (2). On the membrane (2) there is seated a ram (16) which rests against a central part (7) of a spring plate (6). The central part (7) is connected by means of two flexural beam sections (9, 10) with the edge of the spring plate (6). Furthermore, web sections (13, 14, 15) connect the central part (7) to the edge part (8). For the adjustment of the measurement transformer the web sections (13, 14, 15) can be cut through. The more web sections (13, 14, 15) are cut through, the easier it is for the central part (7) to be displaced relative to the edge part (8). Wire strain gauges (11, 12) on the beam sections (9, 10) register this displacement.

23 Claims, 1 Drawing Sheet

MEASUREMENT TRANSFORMER

FIELD AND BACKGROUND OF THE INVENTION

The invention relates to a measurement transformer having at least one flexure beam onto which a wire strain gauge is applied.

Such a measurement transformer is described, for instance, in Federal Republic of Germany OS 29 16 427.

Measurement transformers in which a wire strain gauge arrangement responds to an elastic deformation fo elements which are subjected to mechanical load serve for the measuring of force, torque, weight or pressure. Modern measurement transformers contain a plurality of, for instance, four wire strain gauge devices which are connected into the four branches of a complete electric bridge circuit. In order to permit a basic adjustment of the measurement transformer it is known in accordance with the aforementioned Federal Republic of Germany OS 29 16 427 to bridge individual sections of electric line paths of the bridge circuit by separatable sections of different cross section. In this way different resistances can be obtained in the bridged regions so that the measurement transformer can be adjusted electrically. The range within which the adjustment can be changed in this manner is, however, relatively small. It is frequently necessary to use measurement transformers for different measurement ranges and in this connection to change them as little as possible. Frequently also the tolerances of measurement transformers are so great that balancing is not possible by electrical means.

It is an object of the invention to develop a measurement transformer of the aforementioned type which can be changed to a particularly large extent with respect to its measurement range and which can be adjusted particularly simply to a base value.

SUMMARY OF THE INVENTION

According to the invention, the elasticity of the flexural beam (flexural beam sections 9, 10) can be varied by reducing its load-bearing cross section.

The advantage of the measurement transformer of the invention is that, after mounting, its basic adjustment can be changed in particularly simple fashion in the manner, for instance, that the load-bearing cross section of the flexural beam is reduced by laser beams. Due to the invention no electrical components need be changed. The basic adjustment can be changed by correspondingly large changes in cross section over a very large range so that the measurement transformer of the invention can be used for different applications with different measurement ranges without any change in the electrical system.

The reducing of the load-bearing cross section is particularly simple if the flexural beam (9, 10) has separable web sections (13, 14, 15).

One alternative advantageous possibility of changing the load-bearing cross section of the flexural beam resides in the fact that the flexural beam (9, 10) has incisions (17, 18) and/or dents which are variable in their length and/or width.

The measurement transformer of the invention is particularly suitable for the measurement of pressure if it has a pressure chamber which is sealed off by a membrane (2) and if on the outside of the pressure chamber a ram (16) rests against the membrane (2) and a structural part (middle part 7) which is connected to the flexural beam. Since in the case of such a pressure-sensor the membrane entirely seals off the pressure chamber and can be shaped exclusively with reference to the sealing function and low rigidity, it is particularly simple to create a pressure sensor which is absolutely pressure tight.

In the case of a measurement transformer according to the invention which is developed as pressure sensor, the reduction in the load-bearing cross secton of the flexural beam can be obtained particularly easily if the flexural beam (9, 10) is provided in a circular spring plate (6) which has a concentric circular central part (7) which, by means of two spoke-like flexural-beam sections (9, 10) and separable web sections (13, 14, 15), is connected to the edge part (8) of the spring plate (6).

In a measurement transformer according to the following, spring plate and mounting ring form a force pickup. With this measurement transformer the spring plate (6) is arranged on a rigid mounting ring (5) and this mounting ring (5) rests via several balls (3, 4) over the membrane (2) on the housing (1) of the pressure chamber. The stiffness of this force pickup is advantageously high as compared with the membrane. By the rigid mounting ring it is possible in particularly simple manner to produce a favorable clamping of the spring plate which is free of initial tension. The combination of a slack membrane with a rigid force pickup has the result that the force transmitted by the ram is in a very precise relationship to the pressure acting on the membrane and the entire system has only a small amount of hysteresis.

BRIEF DESCRIPTION OF THE INVENTION

The invention permits numerous possible embodiments.

With the above and other objects and advantages in view, the present invention will become more clearly understood in connection with the detailed description of a preferred embodiment, when considered with the accompanying drawings, of which:

FIG. 1 is a very schematic longitudinal section through a measurement transformer of the inventio developed as pressure sensor; and FIG. 2 is a top view of the measurement transformer of FIG. 1.

DETAILED DESCRIPTION OF THE PREFERRED EMBODIMENT

The measurement transformer shown consists of a housing 1 which is adapted to be inserted, for instance, into the housing (not shown) of a pressure chamber in which pressure is to be measured. The housing 1 is closed off on top by an elastic membrane 2. Balls 3, 4, on which a mounting ring 5 of a spring plate 6 rests, lie on top of the housing 1.

Figure 1:
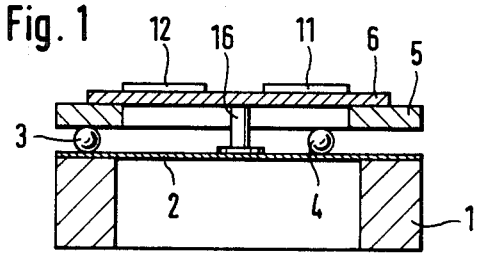
Figure 2:
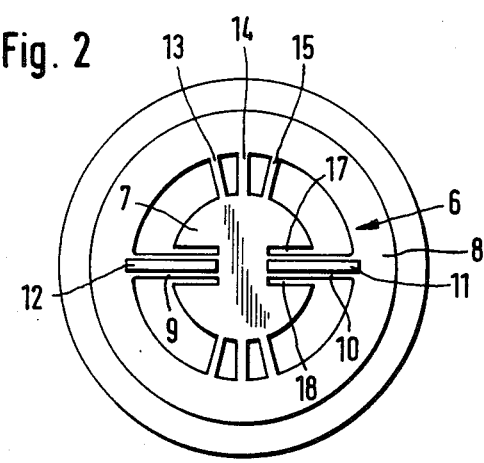

The shape of the spring plate 6 can be noted from FIG. 2. It consists essentially of a concentric circular central part 7 and an annular edge part 8. Two flexural beam sections 9, 10 connect the central part 7 to the edge part 8. A strain wire gauge 11, 12 is arranged on each of the flexural beam sections 9, 10. Aside from the flexural beam sections 9, 10 the central part 7 is connected to the edge part 8 by web sections, for instance 13, 14, 15.

In order to be able to act on the spring plate 6 in case of a rise of pressure within the housing 1, a ram 16 is seated on the membrane 2, the ram lifting the central part 7 upon an arching of the membrane 2. The flexural beam sections 9 and 10 then bend so that the wire strain gauges 11, 12 can produce the corresponding measurement value.

If the sensitivity of the measurement transformer is to be increased then it is merely necessary to cut through one or more of the web sections 13, 14, 15, for instance by means of laser beams. The sensitivity of the measurement transformer can alternately also be changed in the manner that incisions 17, 18 are extended to a greater or lesser extent into the central part 7 on both sides of the flexural beam sections 9, 10. As a result of such incisions 17, 18 the length of the flexural-beam sections 9, 10 can be changed.

We claim:

1. A measurement transformer having at least one flexural beam onto which a wire strain gauge is applied, and wherein
    said transformer comprises a spring plate having an inner portion and an outer portion, and a set of webs extending across a space between said inner portion and said outer portion for interconnecting said inner portion with said outer potion, said flexural beam being formed as an extension of said inner portion;
    the configuration of said set of webs with said inner portion and said outer portion constituting means for allowing a cutting away of a portion of a web to reduce its load-bearing cross section so as to permit the elasticity of the flexural beam to be varied by a reduction in its load-bearing cross section subsequent to deployment of said measurement transformer.

2. The measurement transformer according to claim 1, wherein
    the flexural beam is formed with incisions located to permit adjustment in their length.

3. The measurement transformer according to claim 1, wherein
    the flexural beam is formed with detents located to permit adjustment in their length.

4. The measurement transformer according to claim 1, wherein
    the flexural beam is formed with incisions located to permit adjustment in their width.

5. The measurement transformer according to claim 1, wherein
    the flexural beam is formed with detents located to permit adjustment in their width.

6. The measurement transformer according to claim 1, wherein
    the measurement transformer further comprises a pressure chamber which is sealed off by a membrane; said transformer further comprising
    a ram disposed on the outside of the pressure chamber and resting against the membrane; and
    a centrally located structural part which is connected to the flexural beam.

7. The measurement transformer according to claim 1, wherein
    said spring plate is circular, said inner portion and said outer portion being concentric circular parts of which said inner portion is a central part and said outer potion is an edge part, there being two spoke-like flexural-beam sections and separate web sections of said set of webs connecting said central part to said edge part of the spring plate.

8. The measurement transformer according to claim 7, wherein
    said transformer further comprises a pressure chamber sealed off by a membrane, a rigid mounting ring, and a plurality of balls; and wherein
    said spring plate is positioned on said mounting ring, and said mounting ring rests via said balls above the membrane, said membrane being disposed on a housing of the pressure chamber.

9. A measurement transformer for connection with force-producing apparatus to measure a force thereof, said transformer comprising:
    a strain guage;
    a spring plate cut out to form a set of radially extending webs, said plate having an inner portion and an outer perimetric portion, said webs extending from said inner portion to said outer portion, a central part of said plate defining a flexible beam, said strain guage being secured to said beam for flexing therewith; and
    means for applying a force normal to said plate to flex said plate for measurement of the force; and wherein
    said webs are sufficiently thin as measured in a direction of application of said force, to permit a cutting of at least one of said webs for adjusting a measurement range of said transformer subsequent to connection with said apparatus.

10. The measurement transformer according to claim 9, further comprising
    a mounting ring, said perimetric portion of said plate being secured to said ring for resisting said force during a flexing of said plate.

11. The measurement transformer according to claim 10, wherein
    said webs are coplanar.

12. The measurement transformer according to claim 11, wherein
    said webs are symmetrically arranged about a center of said plate.

13. The measurement transformer according to claim 12, wherein
    said ring is circular.

14. The measurement transformer according to claim 13, wherein
    said beam is broader than any one of said webs.

15. The measurement transformer according to claim 14, wherein
    said beam extends diametrically across said plate.

16. The measurement transformer according to claim 15, wherein
    said inner portion is bound by circular edges concentric with said ring.

17. The measurement transformer according to claim 16, wherein
    said force applying means comprises a ram connected to the center of said plate.

18. The measurement transformer according to claim 9, wherein
    said webs are uniformly thick, both before and after said cutting.

19. The measurement transformer according to claim 18, wherein
    there is an even number of said webs to permit a cutting of symmetrically located pairs of said webs.

20. A method for the measurement of force by use of a measurement transformer including an electric strain guage secured to a flexible beam which can be flexed by the force upon connection of the beam to a force-producing apparatus, a flexing of the beam producing an electric signal from the strain guage, the method comprising the steps of:

forming a spring plate with portions cut out to produce webs, said plate having an inner portion and an outer perimetric portion, said webs extending from said inner portion to said outer portion, a central part of said plate defining said flexible beam;

mechanically connecting said plate to said apparatus to receive said force for bending said beam, said webs being sufficiently thin to flex with said beam and to permit a cutting of at least one of said webs;

electrically connecting said strain guage for receipt of an electrical signal therefrom; and subsequently cutting at least one of said webs to vary elasticity of said plate for adjustment of a measurement range of said transformer.

21. The method according to claim 20, wherein said cutting is performed on pairs of said webs symmetrically positioned about a center of said plate.

22. The method according to claim 21, wherein said forming includes buttressing said perimetric portion with a circumferential ring contiguous said perimetric portion.

23. The method according to claim 22, wherein said webs are uniformly thick and extend radially outward from said center of said plate, said webs lying in a plane parallel to a plane of said beam, said cutting being done between said inner portion and said perimetric portion.

* * * * *